United States Patent [19]

Bucaro et al.

[11] 4,162,397

[45] Jul. 24, 1979

[54] FIBER OPTIC ACOUSTIC SENSOR

[75] Inventors: Joseph A. Bucaro, Herndon, Va.; Edward F. Carome, South Euclid, Ohio; Henry D. Dardy, Upper Marlboro, Md.

[73] Assignee: The United States of America as represented by the Secretary of the Navy, Washington, D.C.

[21] Appl. No.: 920,091

[22] Filed: Jun. 28, 1978

[51] Int. Cl.² .................. H04B 9/00; G01V 1/00; H04B 11/00
[52] U.S. Cl. ..................................... 250/199; 340/15; 340/15.5 R; 340/17 R; 358/112; 358/901
[58] Field of Search .............. 250/199; 358/112, 90 L; 340/15, 15.5 R, 17 R

[56] References Cited

U.S. PATENT DOCUMENTS

| 2,972,051 | 2/1961 | Baum | 250/474 |
| 3,625,589 | 12/1971 | Snitzer | 350/96.29 |
| 3,920,982 | 11/1975 | Harris | 350/96.24 |
| 4,068,191 | 1/1978 | Zemon | 350/96.13 |

Primary Examiner—Howard W. Britton
Attorney, Agent, or Firm—R. S. Sciascia; Philip Schneider; Melvin L. Crane

[57] ABSTRACT

An optical fiber acoustical sensor for detecting sound waves in a fluid medium. An optical fiber coil through which a light beam is transmitted is placed in a fluid medium. A sound wave propagating through the fluid medium and incident on the optical fiber coil changes the index of refraction of the optical fiber at the area of incidence. The index change causes a phase shift in the transmitted light which is detectable to denote the presence of the sound wave.

9 Claims, 5 Drawing Figures

FIBER OPTIC ACOUSTIC SENSOR

BACKGROUND OF THE INVENTION

This invention relates to optical fibers and more particularly to the use of optical fibers for the detection of sound waves in a fluid.

Heretofore sound waves have been detected by different types of electromechanical devices such as capacitance microphones and piezoelectric and magnetostrictive transducers. These yield an electrical output signal when exposed to incident sound waves. Such devices provide a means for directly obtaining an electrical signal that varies in time in the same way that the pressure varies in the sound field. Some of the disadvantages of such systems are that they are bulky, expensive and require impedance matching between the sound detector and transmission and signal processing system.

Optical waveguides and optical fibers have been used for conducting optical radiation from one point to another. Uses of such systems have been contemplated in the communication field for communicating optical signals and messages from one place to another. Other systems make use of stress applied to an optical fiber to modulate the optical radiation as it is transmitted through the fiber (for instance, see U.S. Pat. No. 4,068,191).

One system which makes use of an optical fiber coil through which optical radiation is transmitted is disclosed in U.S. Pat. No. 2,972,051. This patent is for the detection of ionizing radiation which permanently changes the optical index of the optical fiber. Further use of such a system has been set forth by George H. Segal et al. in an article "New Real Time Dosimeters Use Fiber Optics" in Naval Research Laboratory Research and Development Highlights, Vol. 1, pp 7 and 8, December 1974.

SUMMARY OF THE INVENTION

The invention comprises an acoustic sensor in the form of a double path optical interferometer. One path includes a fiber coil which is placed in a fluid medium and the other path includes a fiber, which is isolated from the acoustic field. An acoustic field incident on the coil will change the index of refraction of the coil thereby modulating the beam through the coil. The beam through the path which is not subjected to the acoustic field will go unmodulated. The modulated and unmodulated signals are collimated and combined to form an interference pattern which is directed into a photocell. The resulting output beat signal is fed directly to an oscilloscope which is provided with a high pass filter to eliminate low frequency noise. The upper limit of the coil size may be equal to one half the wavelength of the sound to be detected and the lower limit is dictated by the minimum radius of curvature the particular optical fiber can withstand.

DETAILED DESCRIPTION OF THE DRAWINGS

Figure 1:
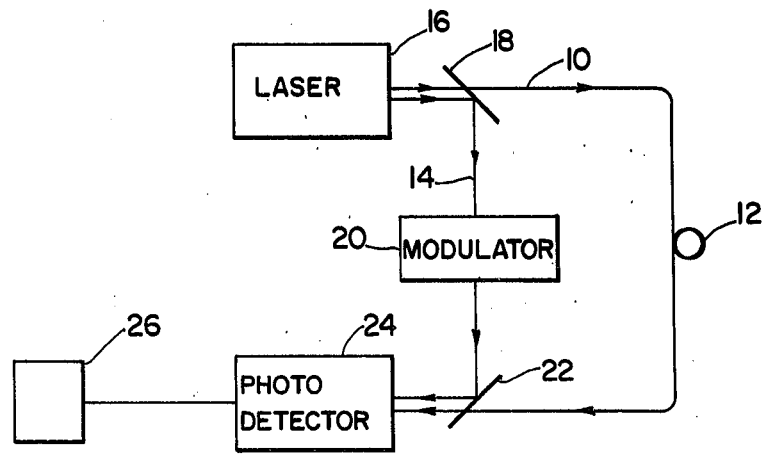
FIG. 1 illustrates the various parts of a preferred optical fiber sensor system with a sensor coil of uniform diameter.

FIG. 1 illustrates an optical acoustic detector including a double-fiber-path interferometer system. One fiber path includes a continuous fiber 10 including a uniform-diameter sensor coil 12 which is placed in the fluid medium where acoustic radiation is to be detected. The other fiber 14 is the same length as fiber 10 and acoustically isolated from, but in parallel with, the sensor path. Optical radiation from a laser 16 or any other suitable source is directed ont a beam splitter 18 set at a 45° angle relative to the optical radiation path. Fifth percent of the optical radiation incident on the beam splitter 18 is directed through the sensor path and 50% of the optical radiation is directed through the isolated path. Radiation in the isolated path is optically modulated by an optical modulator 20, such as an acoustic optic cell, which shifts the optical frequency of the optical radiation by several megahertz. The radiation from the modulator is directed onto a beam splitter 22, set at a 45° angle relative thereto, which relfects the incident radiation into a photodetector 24. The optical radiation passing through the sensor path is incident on the opposite side of the beam splitter 22 and passes through the beam splitter 22. The radiation from the sensor path is optically combined with the modulated radiation and is incident on the photodetector. The resulting beat signal in the photocurrent can by processed by any of the standard FM demodulation techniques, e.g. an FM discriminator 26.

Figure 2:
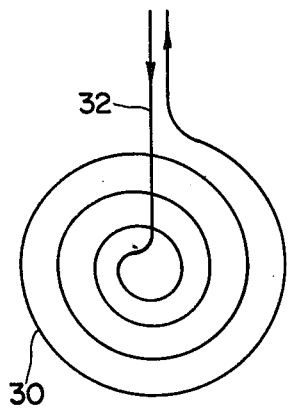
FIG. 2 illustrates a modified sensor as a spiral coil.
Figure 3:
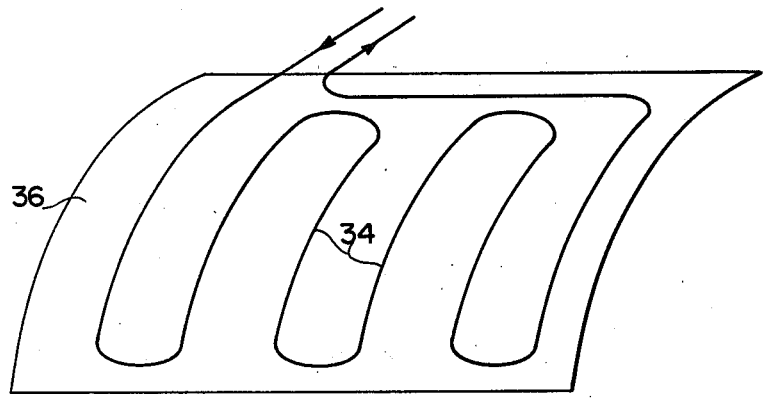
FIG. 3 illustrates a single continuous optical fiber in which the portions of the optical fiber are parallel sections.
Figure 4:
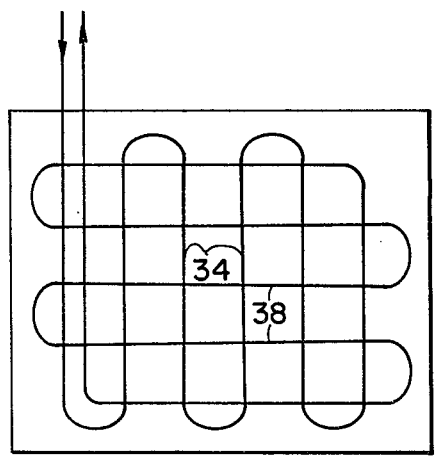
FIG. 4 illustrates a modification including a single continuous optical fiber which includes continuous parallel portions with portions perpendicular to other portions.

Any one of the variously designed acoustic sensors shown in FIGS. 2-4 may be substituted for the coil shown in FIG. 1 for detecting acoustic waves propagating in the fluid medium.

It is obvious that an acoustic signal traveling in a fluid medium does not produce much of an optical phase shift in a single straight optical fiber in the fluid medium. Therefore it is important and necessary in order to produce a detectable change in the optical radiation, due to a change in the characteristics of an optical fiber resulting from incidence of an acoustic signal, to form a sensor that has a multipath configuration. FIG. 1 illustrates an optical fiber coil 12 formed by a plurality of turns of substantially equal radius. Thus, an acoustic signal incident on the optical fiber coil will affect every turn of the coil as the acoustic wave passes the coil. The acoustic wave exerts a pressure on each turn of the optical fiber coil thereby causing variations in the index of refraction, diameter and length of the optical fiber. Even though the change in one turn is minor, the total change in a number of turns in the coil is sufficient to introduce measurable optical phase shifts, doppler frequency shifts, mode conversion and other changes in the propagation characteristics of the optical beam travaling through the fiber.

The modifications illustrated in FIGS. 2-4 all contain multipath optical fiber sensor configurations in which an acoustic wave will be incident on a plurality of sensor lengths. Thus, sensors made of optical fiber in the various configurations will be useful to detect even low-amplitude acoustic waves in a fluid medium. It should be noted that all of the sensors have what may be termed a "repetitive-path pattern".

The upper limit on the size of the coil thickness is equal to one-half the wavelength of the acoustic wave to be detected. The lower limit on the diameter of the coil is dictated by the minimum radius of curvature the turns of the coil can withstand.

FIG. 2 is an acoustic-wave fiber sensor 30 made in the form of a spiral. As shown, the input 32 is directed to the center of the spiral with the fiber spiraling outwardly. Each of the spirals are evenly spaced and may have an overall spiral-diameter as set forth for the coil sensor as shown in FIG. 1.

FIG. 3 illustrates a sensor configuration in which the optical fiber 34 winds back-and-forth across a support backing 36 with adjacent segments of the fiber fixed in parallel lines and equally spaced from each other.

FIG. 4 illustrates a sensor configuration 34 as shown in FIG. 3 with the fiber continuing to provide equally spaced or variably spaced parallel fiber segments 38 perpendicular to those as shown in FIG. 3.

The configurations shown in FIGS. 2-4 are suitable for sensing low frequencies in the approximate range of 1-1000 Hz. Such configurations distribute the sensing length of the fiber over any desired area to obtain directional sensitivity. Such configurations help to eliminate high wavenumber noise.

Figure 5:
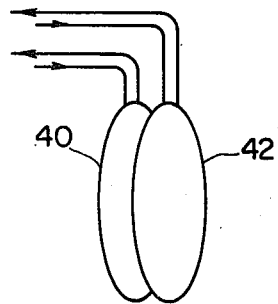
FIG. 5 illustrates a pair of sensor coils such as described in FIG. 1 wherein the coils are axially aligned in spaced parallel relationship.

FIG. 5 illustrates two side-by-side coils 40, 42 whose planes are parallel, the coils being spaced a small fraction of an acoustic wavelength from each other. One coil would replace coil 12 in FIG. 1 and the second would be inserted in path 14. Both coils thus are in the acoustic field. The optical signals from these two coils are heterodyned so that the acoustic pressure difference, or gradient between the two coils can be detected by measuring the difference in the acoustically induced optical phase shifts. Such a configuration will yeild a higly directional detector.

In operation, the sensor system as shown in FIG. 1 is assembled and the sensor coil placed in a fluid medium. The coil is most sensitive when positioned with the plane of the sensor coil perpendicular to the direction of propagation of the acoustic wave. Further, the optical fiber may be either a single mode or a multimode fiber. With a single mode fiber, the sensor system is made as a double-fiber-path interferometer system. Optical radiation such as the output of a continuous wave laser is directed into the optical fiber. A portion of the optical radiation passes through each optical fiber path to the detector. The radiation in the acoustically isolated path is modulated and directed into the photodetector. The optical radiation in the sensor path passes through the acoustic wave sensor coil and is directed to the photodetector. Prior to incidence on the photodetector, the two beams are collimated and optically combined to form an interference pattern which is probed by the photodetector. The resulting output of the photodetector is processed by any well-known standard FM demodulation techniques; e.g., an FM discriminator.

It is well known in optical waveguide art that light passing through an optical fiber is affected by a change in the physical structure of the fiber and or a change in the index of refraction of the fiber. Further, phase shift depends upon the product of the pressure and the interaction length. Since each turn of the coil is subjected to the pressure of the incident acoustic wave, the index of refraction and dimeter of each turn of the coil will be changed. Since the phase shift is dependent upon the product of the pressure applied to the fiber and the interaction length and the interaction length is the total length of all the turns affected, there will be sufficient change to provide a measurable phase shift in the optical radiation passing through the sensor. As an example, a coil such as shown in FIG. 1 may be formed with a fiber having a core diameter of 2.5 $\mu$m with an attenuation of 0.5 dB/m at $\lambda=514.4$ nm.

Substantially the same operation and similar change will take place in optical radiation passing through sensors as shown in FIGS. 2-4. Thus, the sensors as shown in FIGS. 2-4 can be substituted for the coil as shown in FIG. 1 for similar results.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An optical system for detecting acoustic wave energy in a fluid medium which comprises:
   first and second optical paths,
   said first optical path including a single-optic-fiber, repetitive-path, acoustic-wave sensor means which may be placed in a fluid medium to detect an acoustic wave,
   said second optical path including a single optic fiber acoustically isolated from said fluid medium in parallel with said first optic path;
   means for directing optical radiation in equal amounts through said first and second optical paths;
   means in said second path for modulating said radiation passing therethrough;
   optical radiation detector means for detecting said radiation passing through said first and second paths; and
   means for displaying the output from said detector means.

2. An optical system for detecting acoustic wave energy in a fluid medium as claimed in claim 1 wherein, said single optic-fiber-sensor is in the form of a coil.

3. An optical system for detecting acoustic wave energy in a fluid medium as claimed in claim 1 wherein, said single optic-fiber-sensor means is a spiral.

4. An optical system for detecting acoustic wave energy in a fluid medium as claimed in claim 1 wherein, said single optic-fiber-sensor means includes a plurality of side-by-side equally spaced parallel portions.

5. An optical system for detecting acoustic wave energy in a fluid medium as claimed in claim 1 wherein, said single optic-fiber-sensor means includes a plurality of side-by-side parallel portions and parallel portions perpendicular thereto.

6. An optical system for detecting acoustic wave energy in a fluid medium as claimed in claim 1 wherein, the value of the thickness of said coil is limited to a value which is one-half the wavelength of the acoustic wave to be detected.

7. A method of detecting acoustical wave energy in a fluid medium which comprises:
   forming a first continuous optic fiber into a sensor formed in a repetitive-path pattern,
   placing said sensor into the fluid medium,
   extending a second continuous optic fiber, which is isolated from acoustical energy, in parallel with said sensor, directing equal amounts of optical radiation through said first and second optic fibers, combining the output radiation energy from said first and second optic fibers to form an interference pattern, directing said combined output to a photodetector, and displaying the resulting output of said photodetector.

8. A method as claimed in claim 7 which comprises: modulating said radiation passing through said second optic fiber prior to joining with the output of said first optic fiber.

9. A method as claimed in claim 7 which comprises inserting a second sensor coil in said second continuous optic fiber and placing said second sensor coil in the fluid medium adjacent said sensor in said first optic fiber.

* * * * *